(12) United States Patent
Hashimoto

(10) Patent No.: US 10,457,293 B2
(45) Date of Patent: Oct. 29, 2019

(54) DRIVER MONITORING APPARATUS, DRIVER MONITORING METHOD, AND PROGRAM

(71) Applicant: ALPINE ELECTRONICS, INC., Ota-ku, Tokyo (JP)

(72) Inventor: Shinya Hashimoto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/051,987

(22) Filed: Aug. 1, 2018

(65) Prior Publication Data

US 2019/0071095 A1    Mar. 7, 2019

(30) Foreign Application Priority Data

Sep. 1, 2017    (JP) ................. 2017-168374

(51) Int. Cl.
*B60W 40/08*     (2012.01)
*G06K 9/00*      (2006.01)
*G06K 9/46*      (2006.01)

(52) U.S. Cl.
CPC ........... *B60W 40/08* (2013.01); *G06K 9/0061* (2013.01); *G06K 9/00604* (2013.01);
(Continued)

(58) Field of Classification Search
CPC .......... G06K 9/00845; G06K 9/00255; H04N 5/2256; H04N 5/2351; H04N 5/23229
See application file for complete search history.

(56) References Cited

U.S. PATENT DOCUMENTS

| 8,401,251 B2 | 3/2013 | Sasahara et al. |
| 2017/0178304 A1 | 6/2017 | Matsuura |

(Continued)

FOREIGN PATENT DOCUMENTS

| EP | 2860663 | 4/2015 |
| EP | 3185211 | 6/2017 |
| JP | 4728432 | 4/2011 |

OTHER PUBLICATIONS

Seema Rajput et al., "Comparative Study of Image Enhancement", International Journal of Computer Science, vol. 2, No. 1, Jan. 1, 2013, pp. 11-21.

(Continued)

*Primary Examiner* — Hongmin Fan
(74) *Attorney, Agent, or Firm* — Brinks Gilson & Lione

(57) ABSTRACT

A driver monitoring apparatus has a photographing means for taking a picture of a driver's face, an illumination means for emitting light to the driver's face, a light amount control means for setting the amount of light from the illumination means to a first or second amount of light, a differential image creating means for comparing image information about one image on which the driver's face to which the first amount of light was emitted is photographed with image information about another image on which the driver's face to which the second amount of light was emitted is photographed and then creating a differential image from differential information about brightness of corresponding pixels, a detecting means for detecting the driver's eyes from the differential image created by the differential image creating means, and a state detecting means for detecting the driver' state according to an image of the driver's eyes.

17 Claims, 8 Drawing Sheets

(52) U.S. Cl.
CPC ....... *G06K 9/00845* (2013.01); *G06K 9/4661* (2013.01); *B60W 2040/0818* (2013.01)

(56) References Cited

U.S. PATENT DOCUMENTS

2017/0210357 A1\* 7/2017 Nagai ................... B60K 28/06
2017/0249501 A1\* 8/2017 Van der Sijde .... G06K 9/00255

OTHER PUBLICATIONS

Extended European Search Report for 18190527.4 dated Oct. 18, 2018, 12 pgs.

\* cited by examiner

DRIVER MONITORING APPARATUS, DRIVER MONITORING METHOD, AND PROGRAM

RELATED APPLICATION

The present application claims priority to Japanese Patent Application Number 2017-168374, filed Sep. 1, 2017, the entirety of which is hereby incorporated by reference.

BACKGROUND

1. Field of the Invention

The present invention relates to a driver monitoring apparatus, a driver monitoring method, and a program.

2. Description of the Related Art

One of various possible traffic accidents is human error caused by a decrease in the driver's concentration. Human errors frequently occur when, for example, the driver takes an action other than driving operation, such as conversation or manipulation of a vehicle-mounted device, or the driver's concentration on driving drops due to, for example, fatigue or sleepiness.

The driver by himself cannot easily prevent a drop in concentration caused by fatigue or sleepiness. In view of this, various technologies are proposed that detect the driver's states typified by drowsiness. For example, a technology is known that analyzes images, obtained by photography, of the driver's face and infers the driver's state. In a conventional recognition technology that uses an in-vehicle camera, however, precision in the detection of the driver's state has sometimes been lowered by ambient light, such as street lamp light, which causes variations in illumination. A related technique is disclosed in, for example, Japanese Patent No. 4728432.

The present disclosure addresses the above situation with an object of reducing a decrease, caused by ambient light, in precision with which the driver's state is detected.

SUMMARY

To solve the above problem, a driver monitoring apparatus according to an embodiment has a photographing means for taking a picture of the face of a driver, an illumination means for emitting light to the face of the driver, a light amount control means for controlling the amount of light to be emitted from the illumination means so that the amount of light becomes a first amount of light or a second amount of light, a differential image creating means for comparing image information about one image on which the face of the driver to which the first amount of light was emitted is photographed with image information about another image on which the face of the driver to which the second amount of light was emitted is photographed and then creating a differential image from differential information about brightness of corresponding pixels, a detecting means for detecting the eyes of the driver from the differential image created by the differential image creating means, and a state detecting means for detecting the state of the driver according to an image of the eyes of the driver.

DESCRIPTION OF THE PREFERRED EMBODIMENTS

First Embodiment

A driver monitoring apparatus in this embodiment monitors the state of the driver who operates a vehicle according to the orientation of the driver's face, the open/closed state of the eyes, and the like. This embodiment will be described below with reference to the drawings.

Figure 1:
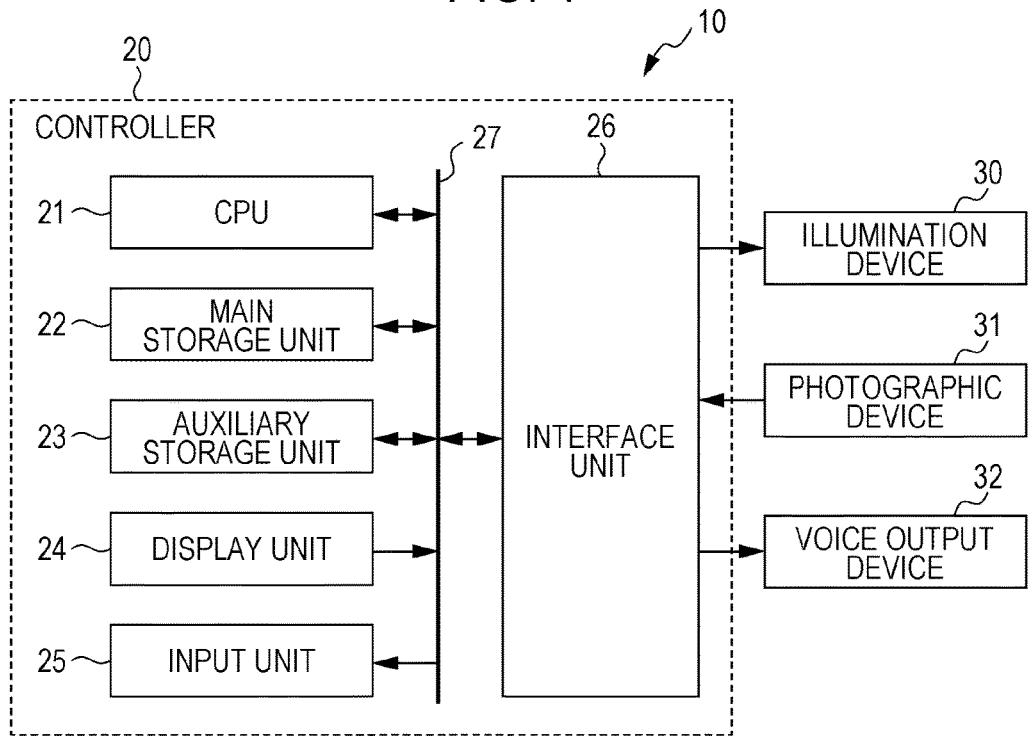
FIG. 1 is a block diagram of a driver monitoring apparatus according to a first embodiment.

FIG. 1 is a block diagram of the driver monitoring apparatus 10 according to this embodiment. This driver monitoring apparatus 10 has a controller 20, an illumination device 30, a photographic device 31, and a voice output device 32, as illustrated in FIG. 1.

Figure 2:
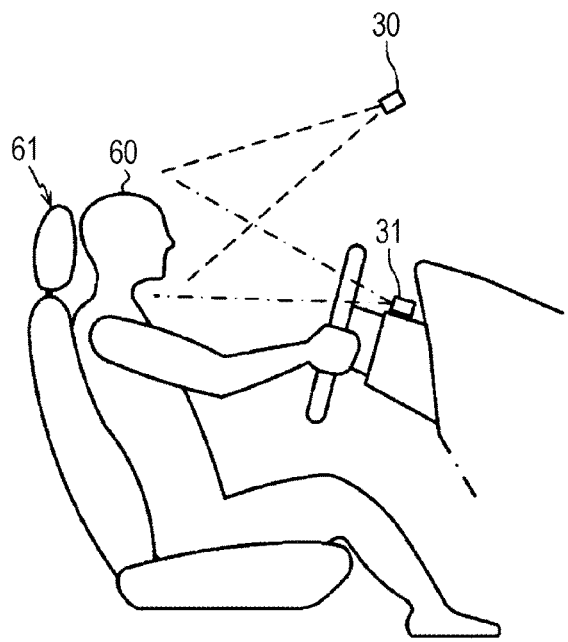
FIG. 2 illustrates the position of a photographic device according to the first embodiment.

The illumination device 30 emits light in the near infrared region, which is outside the visible light region, to the face of the driver. The illumination device 30 has, for example, a near infrared light-emitting diode (LED). This illumination device 30 is attached to, for example, a rear-view mirror, a steering column, or a dashboard, as illustrated in FIG. 2.

The illumination device 30 periodically switches the amount of light to be emitted between a first amount of light and a second amount of light at intervals of time T, under control of the controller 20, which will be described later. If, for example, the photographic device 31 captures images at a rate of 30 frames/second, the illumination device 30 changes the amount of light to be emitted 30 times per second. A plurality of frames of images may be captured in a period continuing until the amount of light is changed. To increase a rate at which the driver's state is detected, however, it is preferable to change the amount of light to be emitted at a rate matching the photographing rate set in the photographic device 31.

Figure 3:
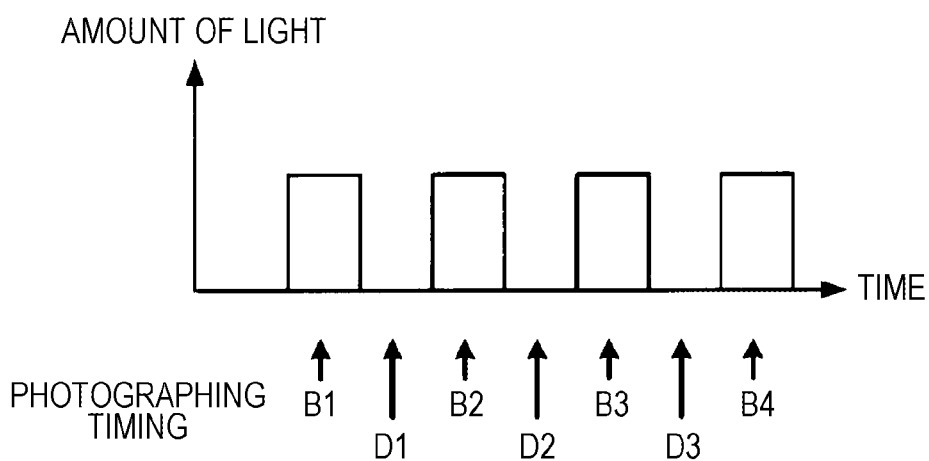
FIG. 3 is a graph illustrating photographing timings.

FIG. 3 is a graph illustrating photographing timings and time-varying changes in the amount of light emitted from the illumination device 30, with time on the horizontal axis and the amount of light on the vertical axis. In FIG. 3, the second amount of light is, for example, zero. That is, FIG. 3 illustrates a case in which the controller 20 controls the illumination device 30 so that it is periodically turned on and off at intervals of time T. In the on period, a predetermined amount of light is emitted. In an off period, light is not emitted. Timings at which the amount of light is changed are synchronized with photographing timings set in the photographic device 31. In FIG. 3, the symbols B1, B2, B3, and B4 are timings at which pictures are taken in a period during which the illumination device 30 emits light, and the symbols D1, D2, and D3 are timings at which pictures are taken during a period in which the illumination device 30 emits no light. That is, the photographic device 31 captures a one-frame image in a period during which the illumination device 30 is emitting light and captures another one-frame image in a next period during which the illumination device 30 is emitting no light.

Figure 4:
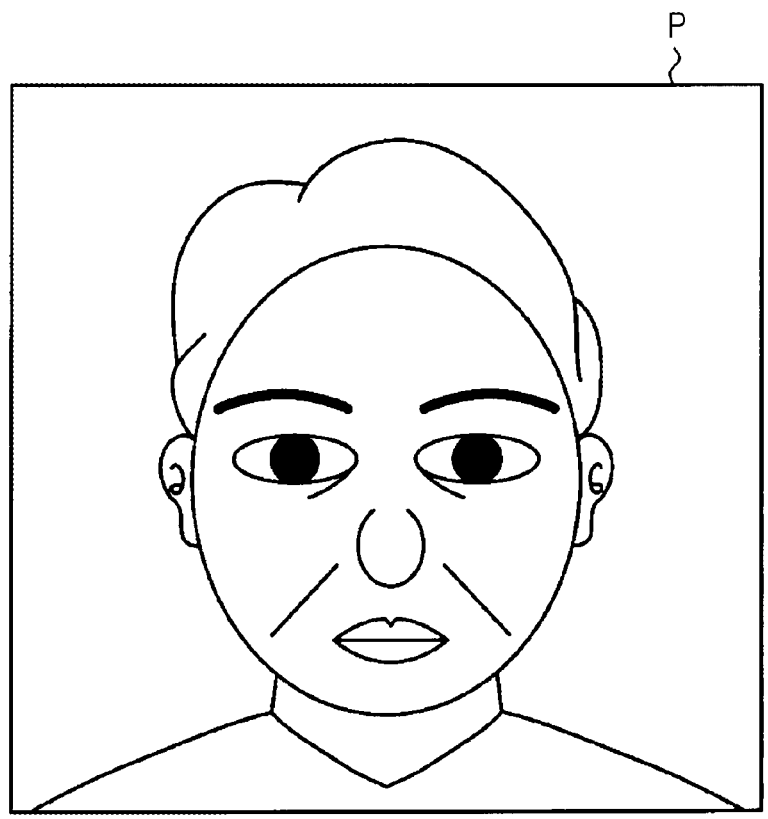
FIG. 4 illustrates an image captured by the photographic device.

The photographic device 31 is, for example, a type of photographic device having a charge-coupled device (CCD) camera. This photographic device 31 is attached to, for example, a steering column or a dashboard as illustrated in FIG. 2. The photographic device 31 takes a picture of the face of a driver 60. FIG. 4 illustrates an image P of the driver 60, which is captured by the photographic device 31. As seen from FIG. 4, the attachment position and viewing angle of the photographic device 31 are adjusted so that the face of the driver 60 seated on a seat 61 illustrated in FIG. 2 is positioned at the center of a field of view. This photographic device 31 sequentially takes pictures of the face of the driver 60 at a rate of, for example, 30 frames/second, and sequentially outputs image information PD about images P obtained by photography to the controller 20.

Referring again to FIG. 1, the voice output device 32 outputs a voice to the driver 60 in response to a command from the controller 20. This voice output device 32 has an amplifier and a speaker that are used to output a voice. If, for example, the controller 20 determines that the concentration of the driver 60 has dropped, the voice output device 32 outputs "Dangerous", "Take care", or the like.

Physically, the controller 20 is a computer that has a central processing unit (CPU) 21, a main storage unit 22, an auxiliary storage unit 23, a display unit 24, an input unit 25, and an interface unit 26, as illustrated in FIG. 1.

The CPU 21 executes processing, which will be described later, according to a program stored in the auxiliary storage unit 23.

The main storage unit 22 includes a random-access memory (RAM) and the like. The main storage unit 22 functions as a working area used by the CPU 21.

The auxiliary storage unit 23 has a non-volatile memory such as a read-only memory (ROM), a magnetic disk, a semiconductor memory, or the like. The auxiliary storage unit 23 prestores programs executed by the CPU 21 and various types of parameters. The auxiliary storage unit 23 also stores the image information PD output from the photographic device 31 and processing results obtained from the CPU 21.

The display unit 24 has, for example, a liquid crystal display (LCD). The display unit 24 displays processing results obtained from the CPU 21 and other information.

The input unit 25 has input keys and pointing devices such as a touch panel. When an operator's command is entered through the input unit 25, the CPU 21 is notified of the command through a system bus 27.

The interface unit 26 has a serial interface and a parallel interface. The illumination device 30, photographic device 31, and voice output device 32 are connected to the system bus 27 through the interface unit 26.

Figure 5:
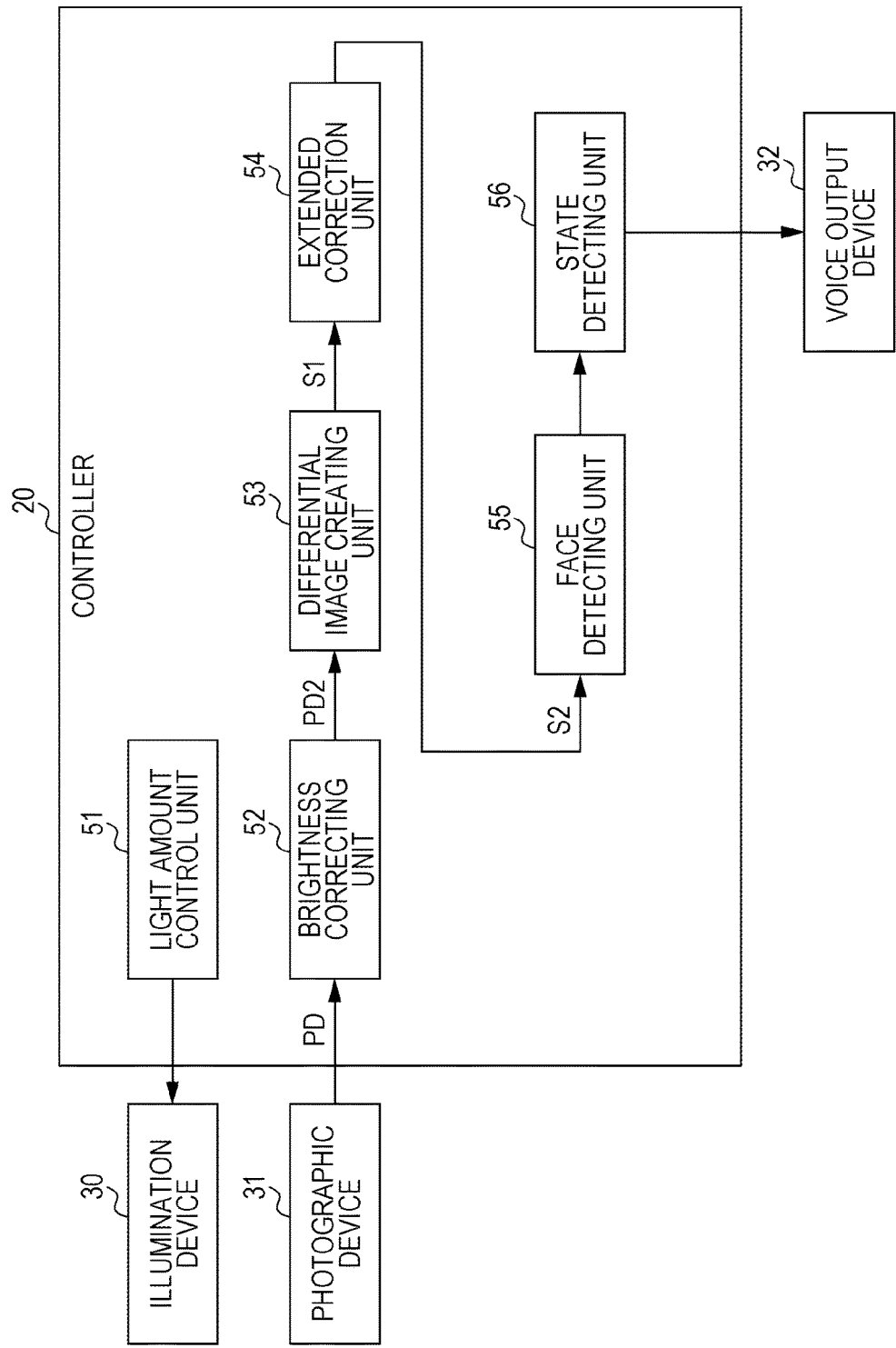
FIG. 5 is a block diagram of a controller according to the first embodiment.

The controller 20 functionally has a light amount control unit 51, a brightness correcting unit 52, a differential image creating unit 53, an extended correction unit 54, a face detecting unit 55, and a state detecting unit 56, as illustrated in FIG. 5.

The light amount control unit 51 controls the amount of light to be emitted from the illumination device 30 so that the amount of light becomes the first amount of light or second amount of light. As illustrated in FIG. 3, the light amount control unit 51 controls the illumination device 30 so that the amount of light to be emitted from the illumination device 30 is changed in synchronization with the photographing timing taken by the photographic device 31. In this synchronization method, a timing at which to change the amount of light from the illumination device 30 may be synchronized with the photographing timing taken by the photographic device 31. Alternatively, the photographing timing taken by the photographic device 31 may be synchronized with a timing at which to change the amount of light from the illumination device 30.

While the photographic device 31 is automatically correcting brightness, to create pre-automatic-brightness-correction image information PD2, the brightness correcting unit 52 subtracts the amount of correction for brightness that has been automatically corrected by the photographic device 31 from brightness in image information obtained from the photographic device 31. It will be assumed that brightness in the image information PD output from the photographic device 31 is represented in the range from 0 to 255. If, for example, the value of the highest brightness among the pixels of a captured image is low (30 or less, for example), differences in brightness among the pixels are small, resulting in an unclear image. In view of this, many photographic devices automatically correct brightness so that the value of the highest brightness (30, for example) becomes, for example 255. Even if the image information PD that has been automatically corrected in this way is used to create differential image information S1 from a difference in brightness between the image information PD about an image captured at timing B1 indicated in FIG. 3 and the image information PD about an image captured at timing D1 indicated in FIG. 3, the resulting image is not an image based on only light emitted from the illumination device 30. That is, an image from which ambient light has been eliminated is not obtained.

Therefore, as described above, to create pre-automatic-brightness-correction image information PD2, the brightness correcting unit 52 subtracts the amount of correction for brightness that has been automatically corrected by the photographic device 31 from brightness in image information obtained from the photographic device 31. The brightness correcting unit 52 acquires, from the photographic device 31, the amount of correction for brightness that has been automatically corrected by the photographic device 31. The brightness correcting unit 52 can also infer the amount of correction for corrected brightness from, for example, an exposure time taken by the photographic device 31.

The differential image creating unit 53 compares image information about one image on which the face of the driver 60 to which the first amount of light was emitted is photographed with image information about another image on which the face of the driver 60 to which the second amount of light was emitted is photographed. The differential image creating unit 53 then creates a differential image from differential information about brightness of corresponding pixels. Specifically, to create differential image information S1, the differential image creating unit 53 subtracts brightness of each pixel indicated in the image information PD about an image captured at timing D1 indicated in FIG. 3 from brightness of the corresponding pixel indicated in the image information PD about an image captured at timing B1 indicated in FIG. 3 to obtain a difference in brightness for each two corresponding pixels. Then, the differential image creating unit 53 creates differential image information S1 by making a comparison between the image information PD about an image captured at timing B2 indicated in FIG. 3 and the image information PD about an image captured at timing D2 indicated in FIG. 3 to obtain a difference in brightness for each two corresponding pixels. This is also true for subsequent timings.

As a first case, it will be considered that identical ambient light is directed at timings B1 and D1. In this case, the influence of the ambient light can be completely eliminated due to processing by the differential image creating unit 53.

As a second case, it will be considered that there is no ambient light at timing B1 and ambient light is directed only at timing D1. If pictures are taken at a rate of 30 frames/second during driving at a speed of 36 km/hour, one image is captured each time a distance of about 30 cm is traveled. Ambient light may change greatly even during a travel of about 30 cm. The brightness of pixels in a portion of the image to which ambient light has been directed is increased. Therefore, pixels in the portion to which ambient light has been directed take negative values in the differential image information S1. The differential image creating unit 53 sets the brightness of each pixel that takes a negative value in the differential image information S1 to 0. If the ambient light is directed to a portion other than the face of the driver 60, the brightness of the background behind the face of the driver 60 takes a value of 0. Therefore, precision with the portion of the face of the driver 60 can be increased.

As a third case, it will be considered that ambient light is directed only at timing B1 and there is no ambient light at timing D1. In this case, the influence of the ambient light cannot be eliminated from the differential image information S1. When the probability of the occurrence of the first case to the third case is considered, however, the influence of ambient light can be eliminated with a high probability.

Figure 6A:
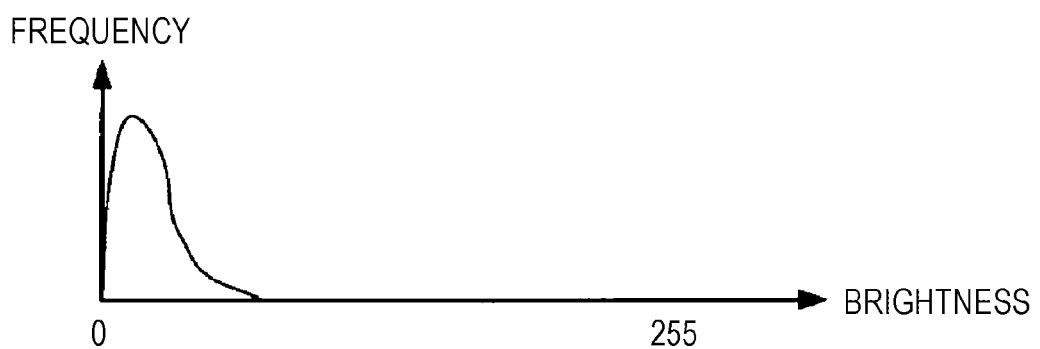
FIGS. 6A and 6B are graphs illustrating extended correction.
Figure 6B:
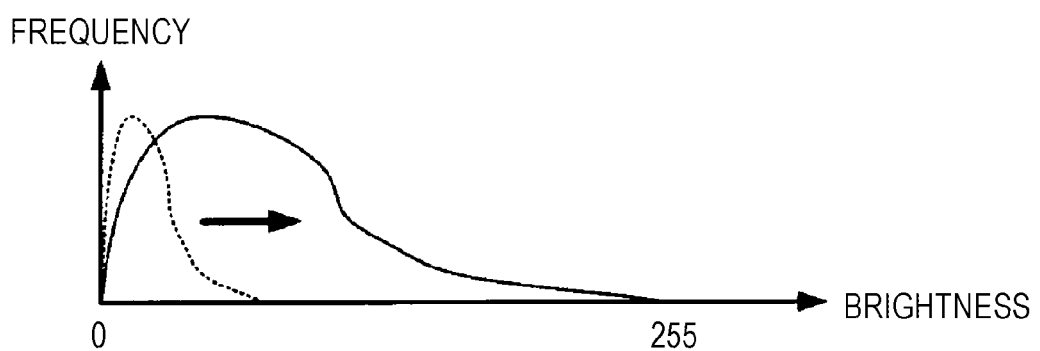

The extended correction unit 54 corrects the brightness of the differential image created by the differential image creating unit 53. Specifically, the extended correction unit 54 applies histogram expansion to the differential image information S1 created by the differential image creating unit 53 to correct the brightness. Histogram expansion is processing in which, among the pixels of an image, the lowest brightness is set to, for example, 0 and the highest brightness is set to, for example, 255. Brightness at intermediate levels undergoes conversion correction by proportional apportionment. In a brightness distribution for the differential image information S1, pixels may concentrate in a low-brightness region. That is, in frequency analysis performed for the brightness of the pixels included in the differential image information S1, a difference between the lowest brightness and the highest brightness may be small, as illustrated in FIG. 6A. If an image has a small difference between the lowest brightness and the highest brightness, the image is not sharp and is unclear. The extended correction unit 54 performs extended correction so that the highest brightness indicated in FIG. 6A takes a value of, for example, 255. FIG. 6B illustrates a brightness distribution obtained by applying extended correction to FIG. 6A. Due to this correction, differences in brightness among the pixels can be increased, so it is possible to create a sharp image on which the face portion, background, eyes, nose, mouth, and the like can be easily distinguished.

The face detecting unit 55 detects, from post-extended-correction differential image information S2, the eyes, nose, and mouth of the driver 60 as well as the orientation of the face and the open/closed state of the eyes, which will be described later in detail.

The state detecting unit 56 detects the state of the driver 60 from images for the eyes, nose, and mouth of the driver 60 as well as the orientation of the face and the open/closed state of the eyes, which have been detected. Specifically, the state detecting unit 56 infers a decrease in the concentration of the driver 60 from the orientation of the face and the open/closed state of the eyes.

The controller 20 structured as described above monitors the driver 60. If, for example, the controller 20 determines that the concentration of the driver 60 has decreased, the controller 20 outputs an alarm to the driver 60. The operation of the driver monitoring apparatus 10 according to this embodiment will be described below with reference to the drawings.

Figure 7:
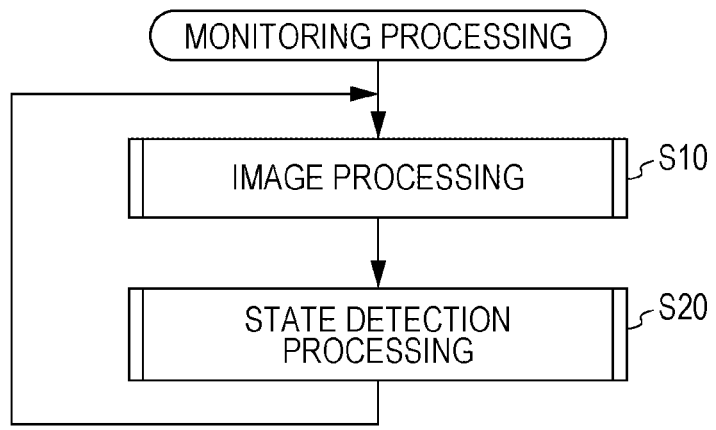
FIG. 7 is a flowchart illustrating processing executed by a CPU.

The flowchart in FIG. 7 is based on a series of monitoring processing algorithms of programs executed by the CPU 21. A series of monitoring processing illustrated in the flowchart in FIG. 7 is executed when, for example, the ignition switch of the vehicle is turned on.

Figure 8:
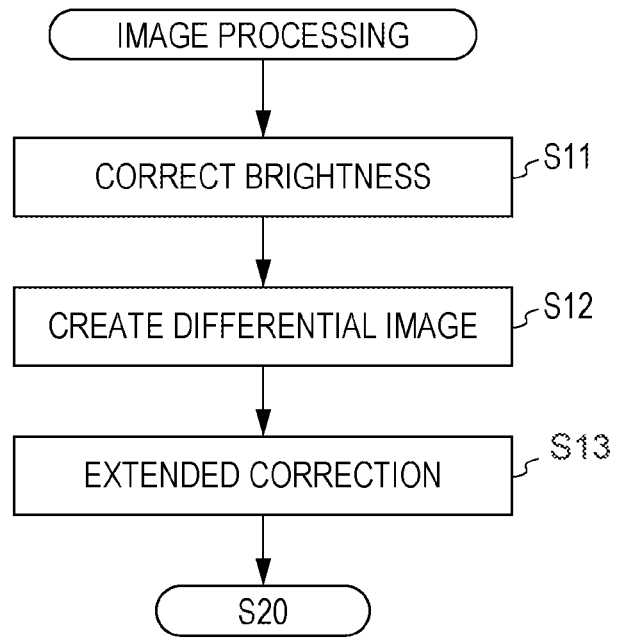
FIG. 8 is a flowchart illustrating image processing executed by the CPU.

The CPU 21 receives image information PD sequentially transmitted from the photographic device 31 and performs image processing to create differential image information S2 (step S10). Specifically, as illustrated in FIG. 8, the brightness correcting unit 52 creates image information PD2, which is information before automatic brightness correction by the photographic device 31, through brightness correction (step S11). Next, the differential image creating unit 53 creates differential image information S1 from image information PD2 about an image captured in a period during which the illumination device 30 emits light and image information PD2 about an image captured in a period during which the illumination device 30 emits no light (step S12). In addition, the extended correction unit 54 performs histogram extended correction on the differential image information S1 to create differential image information S2 (step S13). Upon completion of the processing in step S13, the CPU 21 causes processing to proceed to step S20 in FIG. 7.

Next, the CPU 21 performs state detection processing, which will be described later with reference to FIG. 9, to detect the state of the driver 60 from the image P stipulated by the differential image information S2 (step S20).

Figure 9:
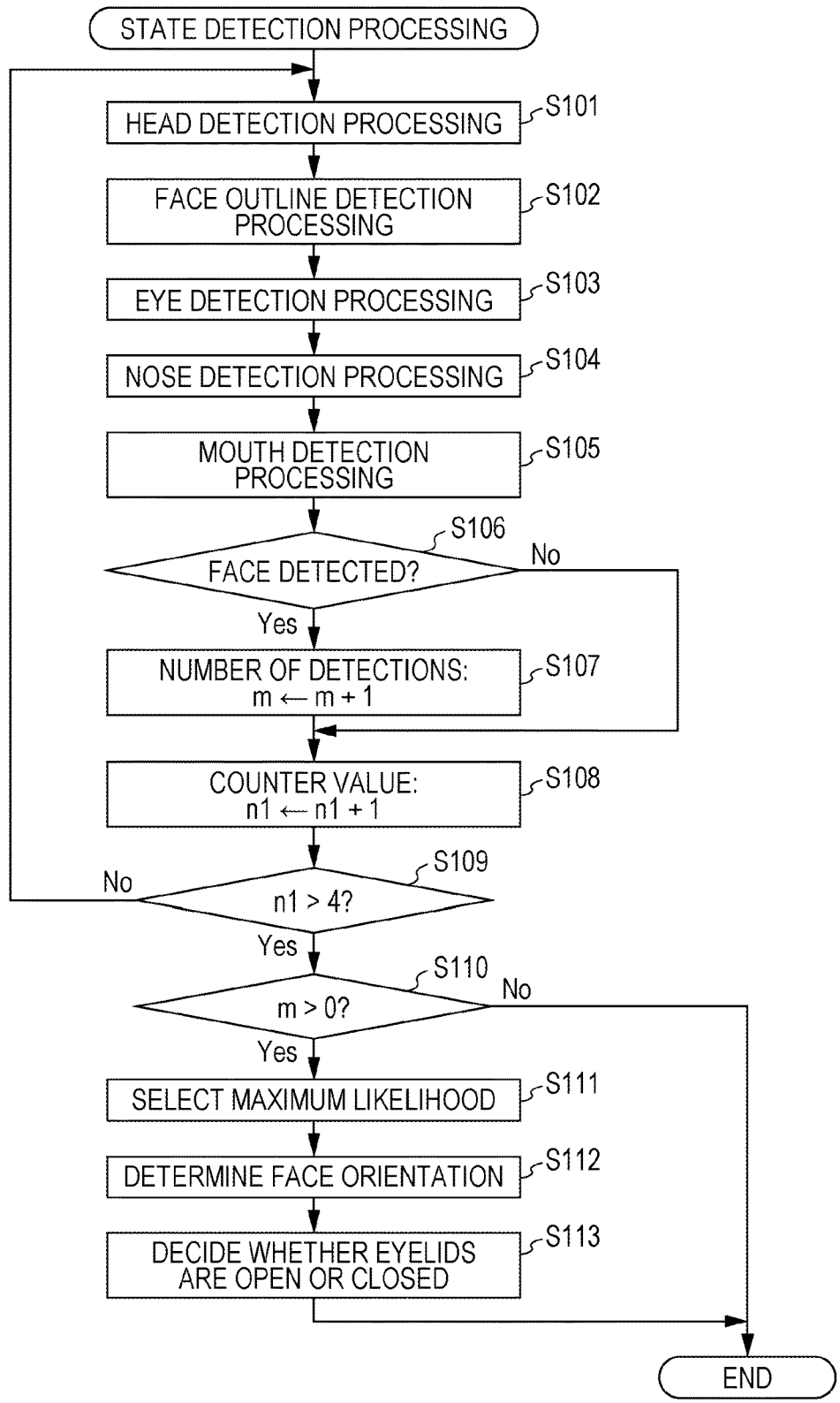
FIG. 9 is a flowchart illustrating state detection processing executed by the CPU.

The flowchart in FIG. 9 illustrates a series of processing executed by the CPU 21 in state detection processing. In state detection processing, the CPU 21 first executes head detection processing to detect the head of the driver 60 from the image P represented by the differential image information S2 (step S101). In head detection processing, the head of the driver 60 is detected according to, for example, feature values such as the brightness of pixels constituting the head, edges representing a boundary between the head of the driver 60 on the image P and its background, and edges representing a boundary between the head and the face. For example, for each edge detected from the image P, the CPU 21 calculates a likelihood that is a probability that the edge is part of the head. If the sum of the likelihoods for all edges exceeds a threshold, the CPU 21 decides that the head is present on the image P. A template may be used to detect the head.

Upon completion of the head detection processing, the CPU 21 performs face outline detection processing to detect the outline of the face of the driver 60 from the image P (step S102). In face outline detection processing, the outline of the face of the driver 60 is detected according to, for example, feature values such as the brightness of pixels constituting the face and edges representing a boundary between the face of the driver 60 on the image P and its background. For example, for each edge detected from the image P, the CPU 21 calculates a likelihood that is a probability that the edge is part of the outline of the face. If the sum of the likelihoods for all edges exceeds a threshold, the CPU 21 decides that the outline of the face is present on the image P. A template may be used to detect the face.

Upon completion of the face outline detection processing, the CPU 21 performs eye detection processing to detect the eyes of the driver 60 from the image P (step S103). In eye detection processing, the eyes of the driver 60 are detected according to, for example, feature values such as the brightness of pixels constituting the eyes and edges representing boundaries between the eyes and other portions of the face of the driver 60 on the image P. For example, for each edge detected from the image P, the CPU 21 calculates a likelihood that is a probability that the edge is part of the outline of the eyelids and irises constituting the eyes. If the sum of the likelihoods for all edges exceeds a threshold, the CPU 21 decides that an image of the eyes is present on the image P.

The CPU 21 may use a template for eyes to detect the eyes of the driver 60 from the image P. In this case, while moving the template for eye detection on the upper surface of the image P, the CPU 21 calculates a correlation value indicating a normalized mutual correlation as the likelihood. The CPU 21 decides that the image of the eyes is present at the position of the template when the likelihood is equal to or larger than a threshold and is the largest.

Next, the CPU 21 performs nose detection processing to detect the nose of the driver 60 from the image P (step S104). In nose detection processing, the nose of the driver 60 is detected according to, for example, feature values such as the brightness of pixels constituting the nose and edges representing boundaries between the nose and other portions of the driver 60 on the image P. A template may be used to detect the nose, as in eye detection.

Upon completion of the nose detection processing, the CPU 21 performs mouth detection processing to detect the mouth of the driver 60 from the image P (step S105). In mouth detection processing, the mouth of the driver 60 is detected according to, for example, feature values such as the brightness of pixels constituting the mouth and edges representing boundaries between the mouth and other portions of the face of the driver 60 on the image P. A template may be used to detect the mouth, as in eye detection.

As seen from Table 1 below, head detection processing, face outline detection processing, eye detection processing, nose detection processing, and mouth detection processing are performed by using a detection parameter or template based on the value of a counter value n1. If, for example, the counter value n1 is 0, a detection parameter or template optimized to an image of the face facing the front is used to detect the head, the outline of the face, the eyes, the nose, or the mouth. If the counter value n1 is 1, a detection parameter or template optimized to an image of the face facing to the left at an oblique angle is used to detect the head, the outline of the face, the eyes, the nose, or the mouth. If the counter value n1 is 2, a detection parameter or template optimized to an image of the face facing to the right at an oblique angle is used to detect the head, the outline of the face, the eyes, the nose, or the mouth. If the counter value n1 is 3, a detection parameter or template optimized to an image of the face facing to the left is used to detect the head, the outline of the face, the eyes, the nose, or the mouth. If the counter value n1 is 4, a detection parameter or template optimized to an image of the face facing to the right is used to detect the head, the outline of the face, the eyes, the nose, or the mouth.

In the above detection processing, a likelihood is obtained from the feature values of a detection parameter or template indicated in Table 1 and the feature values extracted from the image P, after which it is determined whether the head, the outline of the face, the eyes, the nose, or the mouth has been detected, depending on whether the obtained likelihood is equal to or larger than a threshold.

TABLE 1

| Counter value n1 | Detection parameter or template to be used |
|---|---|
| 0 | Optimized to an image of the face facing the front. |
| 1 | Optimized to an image of the face facing to the left at an oblique angle. |
| 2 | Optimized to an image of the face facing to the right at an oblique angle. |
| 3 | Optimized to an image of the face facing to the left. |
| 4 | Optimized to an image of the face facing to the right. |

Next, the CPU 21 decides whether the face stipulated by the counter value n1 has been detected from the image P (step S106). If, for example, the counter value n1 is 0, a detection parameter or template optimized to an image of the face facing the front is used to detect the head, the outline of the face, the eyes, the nose, and the mouth in processing in steps S101 to S105 above. If any one of the head, the outline of the face, the eyes, the nose, and the mouth that correspond to the detection parameter optimized to an image of the face facing the front is not detected from the image P, it is decided that the face facing the front has not been detected from the image P. If the head, the outline of the face, the eyes, the nose, and the mouth that correspond to that detection parameter are detected from the image P, it is decided that the face facing the front has been detected from the image P. If the counter value n1 is 1, a detection parameter or template optimized to an image of the face facing to the left at an oblique angle is used to detect the head, the outline of the face, the eyes, the nose, and the mouth. This is also true for other values of the counter value n1.

If the CPU 21 decides that the face stipulated by the detection parameter indicated by the counter value n1 has been detected (the result in step S106 is Yes), the CPU 21 increments the value of a counter value m, which indicates the number of detections, by one (step S107). This is done to leave a history of the detection of the corresponding face.

If the CPU 21 decides that the corresponding face has not been detected from the image P (the result in step S106 is No) or has terminated the processing in step S107, the CPU 21 increments the value of the counter value n1 by one (step S108). Next, the CPU 21 decides whether the value of the counter value n1 is larger than 4 (step S109). If processing in which the five detection parameters or templates indicated in Table 1 are used has not been terminated for the image P (the result in step S109 is No), the CPU 21 uses a next detection parameter or template to repeatedly execute processing in steps S101 to S109.

If five types of comparison processing in which the five detection parameters or templates indicated in Table 1 are used has been terminated (the result in step S109 is Yes), the CPU 21 resets the counter value n1 and decides whether the counter value m, which indicates the number of detections, is larger than 0 (step S110). If the CPU 21 decides that a face has never been detected from the image P (if m is 0) (the result in step S110 is No), the CPU 21 resets the counter value m, terminates the state detection processing, and causes processing to return to step S10. The CPU 21 then executes processing in steps S10 and S20 for next image information PD.

If the CPU 21 decides that a face has been detected from the image P at least once (if m is larger than 0) (the result in step S110 is Yes), the CPU 21 resets the counter value m and selects the largest likelihood of the counter value n1 (step S111). In the selection of the largest likelihood, the CPU 21 calculates the sum of likelihoods in processing in steps S101 to S105 for each value of the counter value n1.

If likelihoods for the head, the outline of the face, the eyes, the nose, and the mouth in processing in steps S101 to S105 are respectively denoted LH1, LH2, LH3, LH4, and LH5, a likelihood LHn1 corresponding to an arbitrary counter value n1 is represented as the sum of LH1 to LH5 (LHn1=LH1+LH2+LH3+LH4+LH5). Therefore, the CPU 21 calculates the likelihood LHn1 for each of the values (0 to 4) of the counter value n1. Then, the CPU 21 selects the value of the counter value n1 corresponding to the largest likelihood LHn1.

Next, the CPU 21 makes a decision as to the orientation of the face of the driver 60 according to the selection result based on the likelihood (step S112). Specifically, as seen from Table 1, if the likelihood is the largest when the counter value n1 is 0, the CPU 21 decides that the driver 60 faces the front. If the likelihood is the largest when the counter value n1 is 1, the CPU 21 decides that the driver 60 faces to the left at an oblique angle. If the likelihood is the largest when the counter value n1 is 2, the CPU 21 decides that the driver 60 faces to the right at an oblique angle. If the likelihood is the largest when the counter value n1 is 3, the CPU 21 decides that the driver 60 faces to the left. If the likelihood is the largest when the counter value n1 is 4, the CPU 21 decides that the driver faces to the right.

If the CPU 21 decides that the driver 60 faces in a direction other than the direction toward the front, the CPU 21 drives the voice output device 32 to issue an alarm such as "View the front" to the driver 60.

Next, the CPU 21 uses the image P to decide whether the eyelids of the driver 60 are open or closed (step S113). In the decision as to whether the eyelids are open or closed, a distance between an edge representing the upper eyelid of the eye and an edge representing the lower eyelid of the eye is compared with a threshold. If the CPU 21 decides that the eyelids of the driver 60 are closed or that the number of times the eyelids are opened and closed is small, the CPU 21 drives the voice output device 32 to issue an alarm such as "Dangerous" or "Wake up" to the driver 60. If only one eye has been detected, the CPU 21 does not make a decision as to whether the eyelids are open or closed.

Upon completion of the processing in step S113, the CPU 21 causes processing to return to step S10. The CPU 21 then executes processing in steps S10 and S20 for next image information PD.

First Variation

So far, a technology has been described that determines the state of the driver 60 from the orientation of the face of the driver 60, the orientation being determined by comparisons with the five detection parameters or templates indicated in Table 1, and the open/closed state of the eyelids. However, the method of making a decision as to the state (drop in concentration) of the driver 60 does not need to be limited to this technology. By detecting the direction of the line of vision of the driver 60, for example, a decrease in the concentration of the driver 60 can be decided with respect to the situation in the direction in which the vehicle travels. Specifically, by using the central position of the pupil, the radius of the pupil, and the central point of the eyeball, which are detected by the face detecting unit 55, the direction of the line of vision can be obtained according to a known technology.

Second Embodiment

Figure 10:
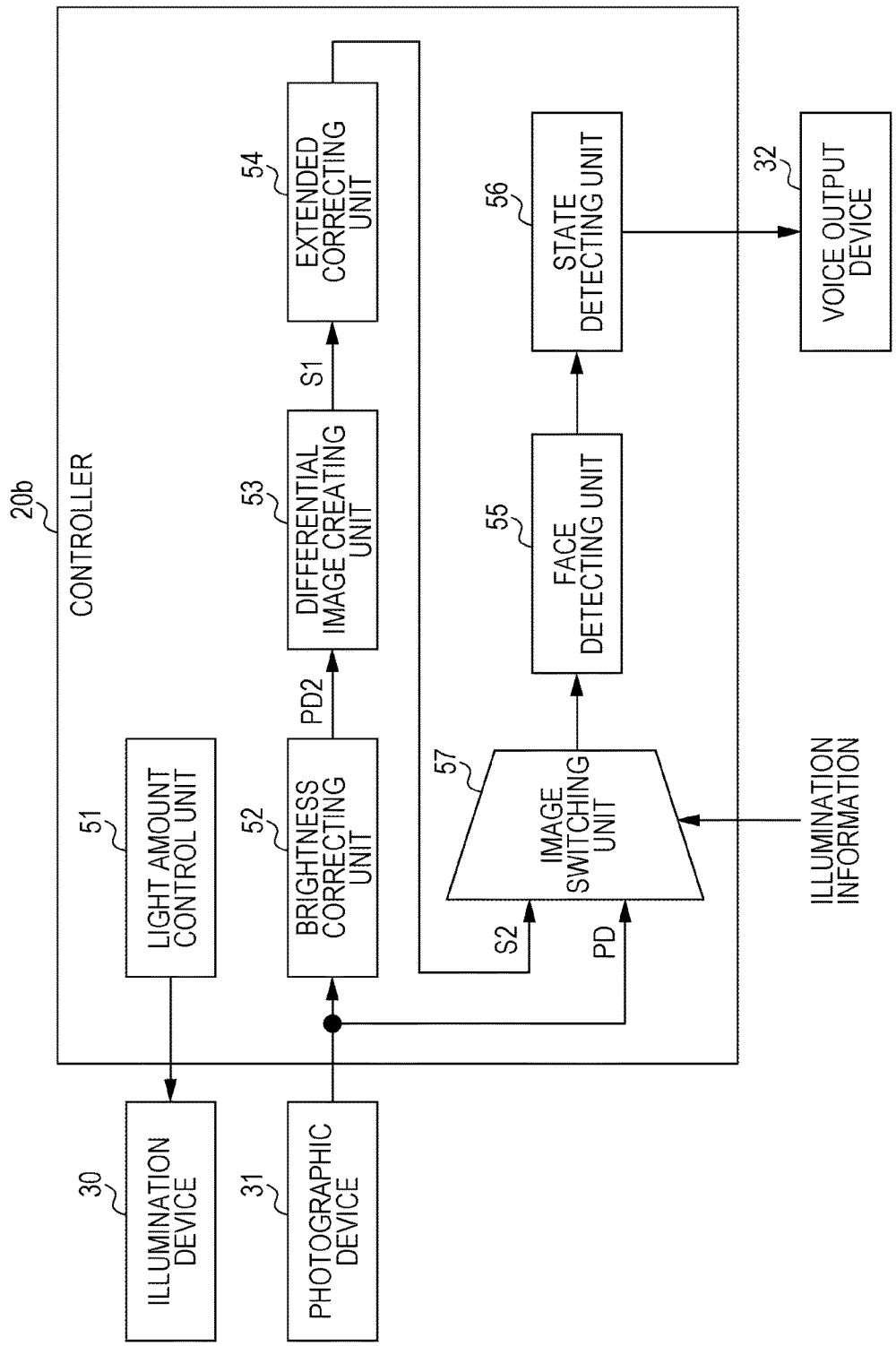
FIG. 10 is a block diagram of a controller according to the second embodiment.

A controller 20b in the driver monitoring apparatus 10 according to a second embodiment differs from the controller 20 in the driver monitoring apparatus 10 according to the first embodiment in that, as illustrated in FIG. 10, the controller 20b has an image switching unit 57 by which a switchover is made to select image information to be supplied to the face detecting unit 55 depending on the amount of ambient light directed to the face of the driver 60.

Figure 11:
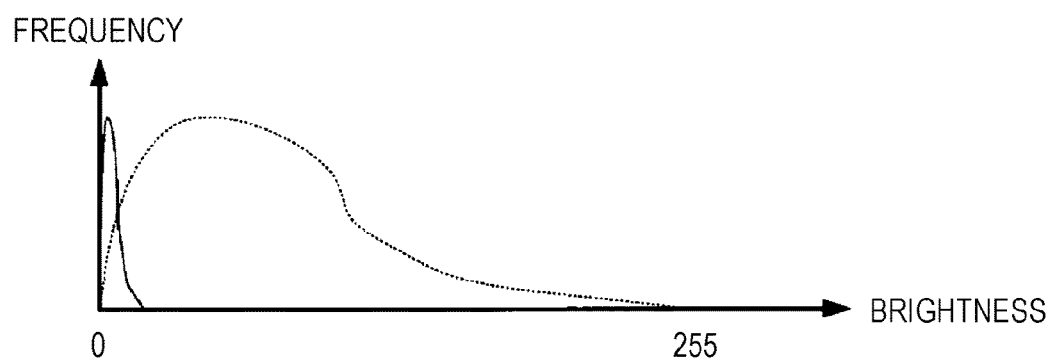
FIG. 11 is a graph to explain an image switching unit according to a second embodiment.

If much ambient light is directed to the face of the driver 60, the average brightness in the image information PD about a captured image is high. If a comparison is made in this situation between brightness in the image information PD obtained by photography in a state in which light is emitted from the illumination device 30 and brightness in the image information PD obtained by photography in a state in which no light is emitted, a difference in brightness is small. In the brightness distribution, obtained from this comparison, of the differential image information S1, pixels concentrate in a region in which brightness is extremely low, as indicated by the solid line in FIG. 11. If histogram expansion is performed on this distribution as indicated by the dotted line in FIG. 11, the noise component included in the differential image information S1 is emphasized too much, which may lower precision in image analysis. Even if face detection and state detection are performed according to the image information PD obtained from the photographic device 31 in the case in which much ambient light is directed to the face of the driver 60, precision in image analysis is less likely to be lowered.

The image switching unit 57 makes a switchover to select image information to be supplied to the face detecting unit 55 depending on the amount of ambient light directed to the face of the driver 60. Specifically, if the amount of ambient light directed to the face of the driver 60 is smaller than a threshold, the image switching unit 57 supplies, to the face detecting unit 55, the differential image information S2 created by the brightness correcting unit 52, differential image creating unit 53, and extended correction unit 54, as described in the first embodiment. If the amount of ambient light directed to the face of the driver 60 is equal to or larger than the threshold, the image switching unit 57 supplies the image information PD obtained from the photographic device 31 to the face detecting unit 55 without alteration. The image information PD obtained from the photographic device 31 may be image information in a period during which the illumination device 30 emits light or may be image information in a period during which the illumination device 30 emits no light. This is because a difference in brightness between them is small.

The image switching unit 57 infers the amount of ambient light directed to the face of the driver 60 from an exposure time obtained from the photographic device 31. This inference is based on the fact that the larger the amount of ambient light directed to the face of the driver 60 is, the shorter the exposure time taken by the photographic device 31 is. Alternatively, the image switching unit 57 may infer the amount of ambient light directed to the face of the driver 60 from illuminance in the portion of the face of the driver 60, the illuminance being obtained from an illumination sensor (not illustrated).

As described above, the driver monitoring apparatus 10 according to the above embodiments, which has the light amount control unit 51, captures an image under different amounts of light emitted from the illumination device 30. The differential image creating unit 53 creates differential image information S1 according to a difference in brightness between images captured under the different amounts of light. Thus, the influence of ambient light is eliminated from image information. According to this differential image information S1, the face detecting unit 55 detects the eyes and other portions of the driver 60, and the state detecting unit 56 detects the state of the driver 60. Thus, the driver monitoring apparatus 10 according to this embodiment can reduce a drop caused due to ambient light in precision with which the state of the driver 60 is detected.

The driver monitoring apparatus 10 according to the above embodiments, which has the extended correction unit 54, creates the differential image information S2 in which changes in brightness in the differential image information S1 are enlarged. This can further improve precision with which the state of the driver 60 is detected.

The driver monitoring apparatus 10 according to the above embodiments, which has the light amount control unit 51, controls the illumination device 30 so that the amount of light to be emitted in synchronization with a photographing timing taken by the photographic device 31 is changed. Thus, differential image information S1 can be created according to the photographic capacity of the photographic device 31, so it is possible to prevent a drop in precision in the detection of the state of the driver 60, the drop being otherwise caused by the motion of the driver 60 as time elapses. It is also possible to increase the response speed of the driver monitoring apparatus 10.

The driver monitoring apparatus 10 according to the above embodiments has the brightness correcting unit 52. Therefore, even if the photographic device 31 automatically corrects brightness, the influence of ambient light can be eliminated and the state of the driver 60 can thereby be detected accurately.

The driver monitoring apparatus 10 in the second embodiment has the image switching unit 57. Therefore, even if much ambient light is directed to the face of the driver 60, it is possible to reduce a drop in precision with which the state of the driver 60 is detected.

In the above description, brightness to be corrected by the brightness correcting unit 52 has been obtained from the photographic device 31. However, this is not a limitation on the method of correcting brightness. The method of correcting brightness may be changed according to the correction characteristics of the photographic device 31. For example, illumination in the portion of the face of the driver 60 may be obtained from an illumination sensor, after which the amount of ambient light directed to the face of the driver 60 may be inferred according to the illumination. The brightness correction characteristics of the photographic device 31 may be prestored in a storage unit in correspondence to the amount of light directed to the subject, as a table. Then, the amount of correction may be obtained with reference to the table.

In the above description, the illumination device 30 has emitted near-infrared light. However, light to be emitted does not need to be limited to near-infrared light. If the object is to remove the influence of ambient light, visible light or ultraviolet light, for example, may be used. However, since the eyes of the driver 60 are illuminated by light, light in a frequency band in which the eyes are not damaged and driving is not impeded needs to be selected.

In the description with reference to FIG. 4, the illumination device 30 has been controlled so as to be turned on and off. However, the illumination device 30 may be controlled so that the amount of light to be emitted from the illumination device 30 is increased or decreased. If, for example, a response from the illumination device 30 is slow when the illumination device 30 stops emitting light and restarts emission, control in increasing or decreasing the amount of light is more preferable than on/off control.

In the description with reference to FIG. 4, the photographic device 31 has captured one frame of image each time the illumination device 30 changes the amount of light to be emitted. However, this is not a limitation on a relationship between a photographing timing and a timing at which to change the amount of light. For example, a plurality of images (two or four images, for example) may be captured each time the amount of light to be emitted is changed. This is effective when the photographing speed of the photographic device 31 is equal to or higher than the photographing speed demanded according to precision in image analysis. In this case, brightness in the differential image information S2 about the plurality of images is statistically processed. Although various statistical processing methods are available, brightness information that is extremely unsuitable may be eliminated or the average of brightness may be calculated, for example. Thus, the signal-to-noise (S/N) ratio can be improved and precision in analysis can be thereby improved.

If state detection processing in step S20 takes a longer processing time than image processing in step S10, the differential image information S2 may be selectively used. In this case, a plurality of pieces of differential image information S2 that have been statistically processed may be supplied to the face detecting unit 55. This is because when statistical processing is performed, improvement in precision in image analysis can be expected.

The differential image information S1 is not limited to differential image information between the image information PD about an image captured at timing B1 indicated in FIG. 3 and the image information PD about an image captured at timing D1 indicated in FIG. 3. In addition to this differential image information, other differential image information may be created between the image information PD about an image captured at timing D1 and the image information PD about an image captured at timing B2. Therefore, as much as twice more differential image information can be created. Due to this processing, even in the third case described in the first embodiment, differential image information in which the influence by ambient light has been eliminated can be obtained as differential image information between the image information PD about an image captured at timing D1 and the image information PD about an image captured at timing B2.

In the description with reference to FIG. 6, the maximum value of brightness in the obtained differential image information S1 has been 255. However, the upper limit of brightness may be suppressed to about 200. In particular, when a line of vision is inferred from the pupils detected by the face detecting unit 55, brightness needs to be corrected so as to prevent halation in the pupil portion. This is because the brightness in the image of the pupils may become high due to low surrounding luminance, and, in this case, if the brightness in the image of the pupils is excessively increased, halation occurs in the pupil portion, which may prevent correct image analysis.

In the description with reference to the flowchart in FIG. 9, the state detecting unit 56 has detected the state of the driver 60 from the eyes, nose, and mouth of the driver 60 as well as the orientation of the face and the open/closed state of the eyes, which have been detected by the face detecting unit 55. However, this is not a limitation on the method of detecting the state of the driver 60. For example, detection of the ears may be added. Alternatively, detection of the nose and mouth may be omitted.

In the description with reference to the flowchart in FIG. 9, the state of the driver 60 has been determined for each frame and an alarm, for example, has been issued, if necessary. However, if it is decided for a plurality of successive images that an alarm needs to be issued, an alarm may be issued as necessary.

In the above embodiments, the voice output device 32 has been operated according to the detection result obtained from the state detecting unit 56. However, this is not a limitation. The detection result may be output to an external device. For example, the seat 61 may be vibrated to draw the attention of the driver 60.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A driver monitoring apparatus comprising:
   a photographing means for taking a picture of a face of a driver;
   an illumination means for emitting light to the face of the driver;
   a light amount control means for controlling an amount of light to be emitted from the illumination means so that the amount of light becomes a first amount of light or a second amount of light;
   a differential image creating means for comparing image information about one image on which the face of the driver to which the first amount of light was emitted is photographed with image information about another image on which the face of the driver to which the second amount of light was emitted is photographed and then creating a differential image from differential information about brightness of corresponding pixels;
   a detecting means for detecting eyes of the driver from the differential image created by the differential image creating means; and
   a state detecting means for detecting a state of the driver according to an image of the eyes of the driver.

2. The driver monitoring apparatus according to claim 1, wherein one of the first amount of light and the second amount of light is zero.

3. The driver monitoring apparatus according to claim 1, further comprising a correcting means for correcting brightness in the differential image created by the differential image creating means, wherein
   the detecting means detects the eyes of the driver from a differential image resulting from correction by the correcting means.

4. The driver monitoring apparatus according to claim 1, wherein the light amount control means controls the amount of light to be emitted from the illumination means so that the amount of light becomes the first amount of light or the second amount of light in synchronization with a photographing timing taken by the photographing means.

5. The driver monitoring apparatus according to claim 1, further comprising a brightness correcting means for creating pre-automatic-brightness-correction image information by subtracting an amount of correction for brightness that has been automatically corrected by the photographing means from brightness in image information obtained from the photographing means, wherein
   the differential image creating means creates differential image information from the pre-automatic-brightness-correction image information.

6. The driver monitoring apparatus according to claim 1, further comprising an image switching means for making a switchover to select image information to be supplied to the detecting means depending on illumination on an image of the face of the driver, wherein
   if the image switching means decides that the illumination on the image of the face of the driver is lower than a predetermined threshold illumination, the image switching means supplies, to the detecting means, image information based on the differential image created by the differential image creating means,
   if the image switching means decides that the illumination on the image of the face of the driver is higher than the predetermined threshold illumination, the image switching means supplies, to the detecting means, the image information obtained from the photographing means, and
   the detecting means detects the eyes of the driver according to the supplied image information.

7. The driver monitoring apparatus according to claim 1, wherein the state detecting means detects an orientation of the face of the driver.

8. The driver monitoring apparatus according to claim 1, wherein the state detecting means detects an open/closed state of the eyes of the driver.

9. A driver monitoring method comprising:
   a photographing step of taking a plurality of pictures of a face of a driver with different amounts of light emitted to the face of the driver;
   a differential image creating step of comparing image information about one image on which the face of the driver to which a first amount of light was emitted is photographed with image information about another image on which the face of the driver to which a second amount of light was emitted is photographed and then creating a differential image from differential information about brightness of corresponding pixels;
   a detecting step of detecting eyes of the driver from the differential image; and
   a state detecting step of detecting a state of the driver according to an image of the eyes of the driver.

10. The driver monitoring method according to claim 9, wherein one of the first amount of light and the second amount of light is zero.

11. The driver monitoring method according to claim 9, further comprising a correcting step for correcting brightness in the differential image created by the differential image creating step, wherein
   the detecting step detects the eyes of the driver from a differential image resulting from correction by the correcting step.

12. The driver monitoring method according to claim 9, wherein the amount of light to be emitted becomes the first amount of light or the second amount of light in synchronization with a photographing timing in the photographing step.

13. The driver monitoring method according to claim 9, further comprising a brightness correcting step for creating pre-automatic-brightness-correction image information by subtracting an amount of correction for brightness that has been automatically corrected by a photographing means from brightness in image information obtained from the photographing means, wherein the differential image creating step creates differential image information from the pre-automatic-brightness-correction image information.

14. The driver monitoring method according to claim 9, further comprising an image switching step for making a switchover to select image information to be supplied to the detecting step depending on illumination on an image of the face of the driver, wherein if the image switching step decides that the illumination on the image of the face of the driver is lower than a predetermined threshold illumination, the image switching step supplies, to the detecting step, image information based on the differential image created by the differential image creating step, if the image switching step decides that the illumination on the image of the face of the driver is higher than the predetermined threshold illumination, the image switching step supplies, to the detecting step, the image information obtained from the photographing step, and the detecting step detects the eyes of the driver according to the supplied image information.

15. The driver monitoring method according to claim 9, wherein the state detecting step detects an orientation of the face of the driver.

16. The driver monitoring method according to claim 9, wherein the state detecting step detects an open/closed state of the eyes of the driver.

17. A program that causes a computer to function as:

a photographing means for taking a picture of a face of a driver;

an illumination means for emitting light to the face of the driver;

a light amount control means for controlling an amount of light to be emitted from the illumination means so that the amount of light becomes a first amount of light or a second amount of light;

a differential image creating means for comparing image information about one image on which the face of the driver to which the first amount of light was emitted is photographed with image information about another image on which the face of the driver to which the second amount of light was emitted is photographed and then creating a differential image from differential information about brightness of corresponding pixels;

a detecting means for detecting eyes of the driver from the differential image created by the differential image creating means; and a state detecting means for detecting a state of the driver according to an image of the eyes of the driver.

\* \* \* \* \*